US011982114B2

(12) United States Patent
Duer

(10) Patent No.: US 11,982,114 B2
(45) Date of Patent: *May 14, 2024

(54) ITEM OF FURNITURE

(71) Applicant: Julius Blum GmbH, Hoechst (AT)

(72) Inventor: Stefan Duer, Schwarzach (AT)

(73) Assignee: JULIUS BLUM GMBH, Hoechst (AT)

(*) Notice: Subject to any disclaimer, the term of this patent is extended or adjusted under 35 U.S.C. 154(b) by 298 days.

This patent is subject to a terminal disclaimer.

(21) Appl. No.: 17/521,181

(22) Filed: Nov. 8, 2021

(65) Prior Publication Data

US 2022/0056744 A1 Feb. 24, 2022

Related U.S. Application Data

(63) Continuation of application No. PCT/AT2020/060180, filed on May 4, 2020.

(30) Foreign Application Priority Data

May 17, 2019 (AT) .............................. A 50447/2019

(51) Int. Cl.
*E05D 15/26* (2006.01)

(52) U.S. Cl.
CPC ......... *E05D 15/262* (2013.01); *E05D 15/264* (2013.01); *E05Y 2201/406* (2013.01); *E05Y 2900/212* (2013.01)

(58) Field of Classification Search
CPC ........... E05Y 2900/212; E05Y 2900/14; E05Y 2201/11; E05Y 2201/406; E05D 11/0054;
(Continued)

(56) References Cited

U.S. PATENT DOCUMENTS 1,873,522 A 8/1932 Abbott et al.
5,991,975 A * 11/1999 Baer ....................... E05D 7/009 16/354
(Continued)

FOREIGN PATENT DOCUMENTS

CN 107002439 8/2017
CN 107002440 8/2017
(Continued)

OTHER PUBLICATIONS

International Search Report issued Jul. 21, 2020 in International (PCT) Application No. PCT/AT2020/060180.
(Continued)

*Primary Examiner* — Andrew Roersma
(74) *Attorney, Agent, or Firm* — Wenderoth, Lind & Ponack, L.L.P.

(57) ABSTRACT

An item of furniture including a furniture carcass, a door wing movably-supported relative to the furniture carcass, and a furniture hinge for movably supporting the door wing, the furniture hinge being hingedly connected to the door wing. A receiving compartment is arranged in or on the furniture carcass for at least partially receiving the door wing, and the receiving compartment is defined by a sidewall of the furniture carcass. At least one cover is configured to be moved at least between a first operating position, in which the cover at least partially covers the receiving compartment, and a second position, in which the cover unblocks the receiving compartment. The furniture hinge includes a control member for moving the cover between the two operating positions upon an at least partial movement of the a door wing within the receiving compartment.

20 Claims, 6 Drawing Sheets

(58) Field of Classification Search
CPC ........... E05D 2011/0072; E05D 15/262; E05D 15/26458; E05D 15/264; E05D 15/58
See application file for complete search history.

(56) References Cited

U.S. PATENT DOCUMENTS

| | | | | |
|---|---|---|---|---|
| 8,303,056 | B2 | 11/2012 | Giorgi | |
| 9,068,386 | B2 | 6/2015 | Ishii et al. | |
| 9,428,946 | B2 | 8/2016 | Martinez Garcia et al. | |
| 10,227,806 | B2 | 3/2019 | Gabl | |
| 10,400,493 | B2 | 9/2019 | Gabl | |
| 10,753,133 | B2 | 8/2020 | Kohlweiss | |
| 11,536,068 | B2 * | 12/2022 | Girotto | E05D 15/26 |
| 2010/0117500 | A1 | 5/2010 | Giorgi | |
| 2012/0080991 | A1 * | 4/2012 | Wilson | F25D 23/028 312/405 |
| 2015/0008811 | A1 | 1/2015 | Ishii et al. | |
| 2015/0191951 | A1 | 7/2015 | Ona-Gonzalez et al. | |
| 2015/0233161 | A1 | 8/2015 | Martinez Garcia et al. | |
| 2016/0201368 | A1 * | 7/2016 | Haab | E05D 7/00 16/103 |
| 2017/0241178 | A1 | 8/2017 | Gabl | |
| 2017/0247924 | A1 * | 8/2017 | Gabl | E05F 1/1066 |
| 2017/0260789 | A1 | 9/2017 | Gabl | |
| 2018/0119470 | A1 * | 5/2018 | Kohlweiss | E05D 15/58 |
| 2018/0128032 | A1 * | 5/2018 | Karle | E05F 15/635 |
| 2022/0074250 | A1 * | 3/2022 | Duer | E05D 15/264 |

FOREIGN PATENT DOCUMENTS

| | | |
|---|---|---|
| CN | 107735542 | 2/2018 |
| CN | 207999161 | 10/2018 |
| DE | 10 2014 018 682 | 6/2016 |
| EP | 2 071 108 | 6/2009 |
| EP | 2 899 344 | 7/2015 |
| JP | WO2013/114730 | 8/2013 |
| JP | 2018-502234 | 1/2018 |
| WO | 99/23337 | 5/1999 |

OTHER PUBLICATIONS

Search Report issued Aug. 10, 2022 in corresponding Chinese Patent Application No. 202080036284.3, with English language translation.

* cited by examiner

ITEM OF FURNITURE

BACKGROUND OF THE INVENTION

The present invention relates to an item of furniture including a furniture carcass, at least one door wing movably-supported relative to the furniture carcass, and at least one furniture hinge for movably supporting the at least one door wing, with the furniture hinge being hingedly connected to the door wing. A receiving compartment is arranged in or on the furniture carcass for at least partially receiving the at least one door wing, and the receiving compartment is defined by at least one sidewall of the furniture carcass. At least one cover is configured to be moved at least between a first operating position, in which the cover at least partially covers the receiving compartment, and a second position, in which the cover unblocks the receiving compartment.

Items of furniture with a movably-supported cover for covering a gap formed between two furniture parts are already known, for example, from EP 2 899 344 A1, EP 2 071 108 A1, and WO 99/23337 A1.

DE 10 2014 018 682 B3 discloses an item of furniture comprising a furniture carcass and a plurality of folding-door elements. The folding-door elements can be transferred from a first position, in which the furniture carcass is covered, into a second position, in which the folded-together folding-door elements are received within an upper receiving compartment of the furniture carcass. The folding-door elements can be lifted from the first position relative to the furniture carcass by a motorized drive. Subsequently, the folding-door elements can be moved into the upper compartment of the furniture carcass by a second motorized drive. Moreover, a movably-supported cover flap is provided, and the cover flap can be actuated by a drive chain configured to be driven by the second motorized drive. By the cover flap, the upper receiving compartment of the furniture carcass can be covered when the folding-door elements are located within the receiving compartment.

SUMMARY OF THE INVENTION

It is an object of the invention to provide an item of furniture of the type mentioned in the introductory part, thereby improving a control of a movement of the cover.

According to the invention, the furniture hinge includes at least one control member for moving the cover between the two operating positions upon an at least partial movement of the at least one door wing within the receiving compartment.

In other words, the furniture hinge includes at least one movably-supported control member configured to act upon the cover. In the first operating position, in which the cover at least partially covers the receiving compartment, the control member is out of engagement from the cover. The control member can only be engaged with the cover upon a predefined position of the door wing within the receiving compartment, so that the cover, by bearing against the control member, can be moved into a second operating position in which the cover unblocks the receiving compartment.

The at least one sidewall can include a vertically extending edge, about which the at least one door wing can be moved. Thereby, the cover is arranged on the at least one sidewall of the furniture carcass. In other words, the door wing can be moved about an edge of the sidewall on which also the cover is arranged. As a result, the cover can be covered by the door wing in at least one relative position of the door wing, so that the cover, in the at least one relative position of the door wing, is not visible from the front.

The control member of the furniture hinge, in the first operating position of the cover, can be spaced from the cover in a depth direction of the receiving compartment. In the second operating position of the cover, the control member of the furniture hinge bears against the cover.

The control member of the furniture hinge can include a control curve for glidingly supporting along the cover. In this way, the start, the course, and the end of a movement of the cover can be controlled in an improved manner in terms of time and kinematics.

According to an embodiment, a movement of the control member of the furniture hinge is coupled to a movement of the furniture hinge. In this way, a variable movement of the control member can be provided over the closing and opening path of the furniture hinge, the variable movement depending on the relative position of the furniture hinge and by which a movement of the cover between the two operating positions can be controlled.

The control member of the furniture hinge can have a, preferably elongated, guide track, and a guide element of the furniture hinge is configured to be guided along the guide track.

According to an embodiment, the cover is configured such that the cover is movable between the first operating position and second operating position by a pivoting movement within an angle range of between 70° and 110°, preferably by substantially 90°.

BRIEF DESCRIPTION OF THE DRAWINGS

Further details and advantages of the present invention result from the following description of figures.

DETAILED DESCRIPTION OF THE INVENTION

Figure 1A:
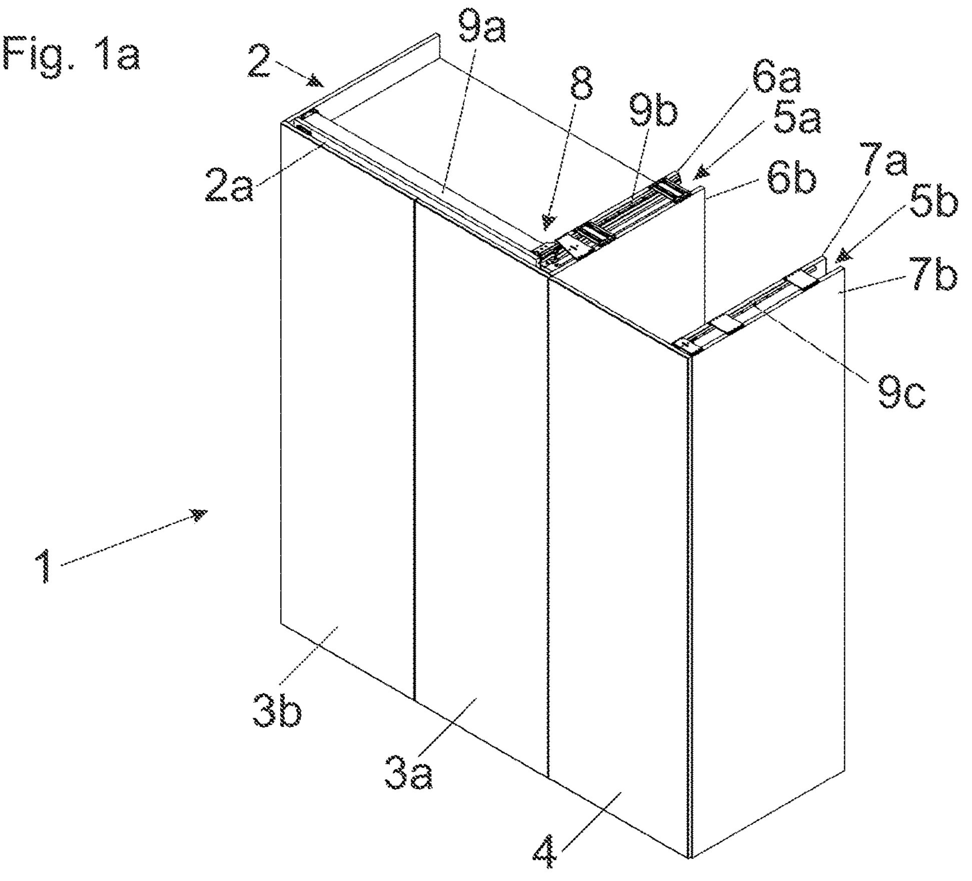
FIG. 1*a*, 1*b* is a perspective view of an item of furniture comprising a furniture carcass and door wings movable relative thereto, the door wings being located in two different positions.

FIG. 1*a* shows a perspective view of an item of furniture 1 comprising a furniture carcass 2 and door wings 3*a*, 3*b*, 4 which are movable relative to the furniture carcass 2. The door wings 3*a*, 3*b* are hingedly connected to one another via a vertically extending axis. By a guide system 8, the door wings 3*a*, 3*b* are movable relative to one another between a first position, in which the door wings 3*a*, 3*b* are aligned substantially coplanar to one another, and a second position, in which the door wings 3*a*, 3*b* are aligned substantially parallel to one another. In the first (coplanar) position, the door wings 3*a*, 3*b* substantially fully cover the furniture carcass 2. In the second (parallel) position, the door wings 3*a*, 3*b* can be inserted into a receiving compartment 5*a* of the furniture carcass 2. The receiving compartment 5*a* is formed by two sidewalls 6*a*, 6*b* mutually spaced from one another in a substantial parallel relationship. The guide system 8 includes a first guide rail 9*a* for guiding the door wings 3*a*, 3*b*, and the first guide rail 9*a* is configured so as to guide the door wings 3*a*, 3*b* along a front face 2*a* of the furniture carcass 2. By a second guide rail 9*b* extending transversely to the first guide rail 9*a*, the door wings 3*a*, 3*b* can be guided along the sidewall 6*a* of the furniture carcass 2.

On the contrary, the door wing 4 is configured as a single door wing 4 which, in a first position, is aligned coplanar to the two other door wings 3*a*, 3*b*. In a second position, in which the door wing 4 is aligned substantially parallel to the sidewall 7*a*, the door wing 4 can be inserted along a guide 9*c* into a further receiving compartment 5*b* of the furniture carcass 2. Likewise, the receiving compartment 5*b* is also formed by two sidewalls 7*a*, 7*b* mutually spaced from one another in a substantial parallel relationship.

Figure 1B:
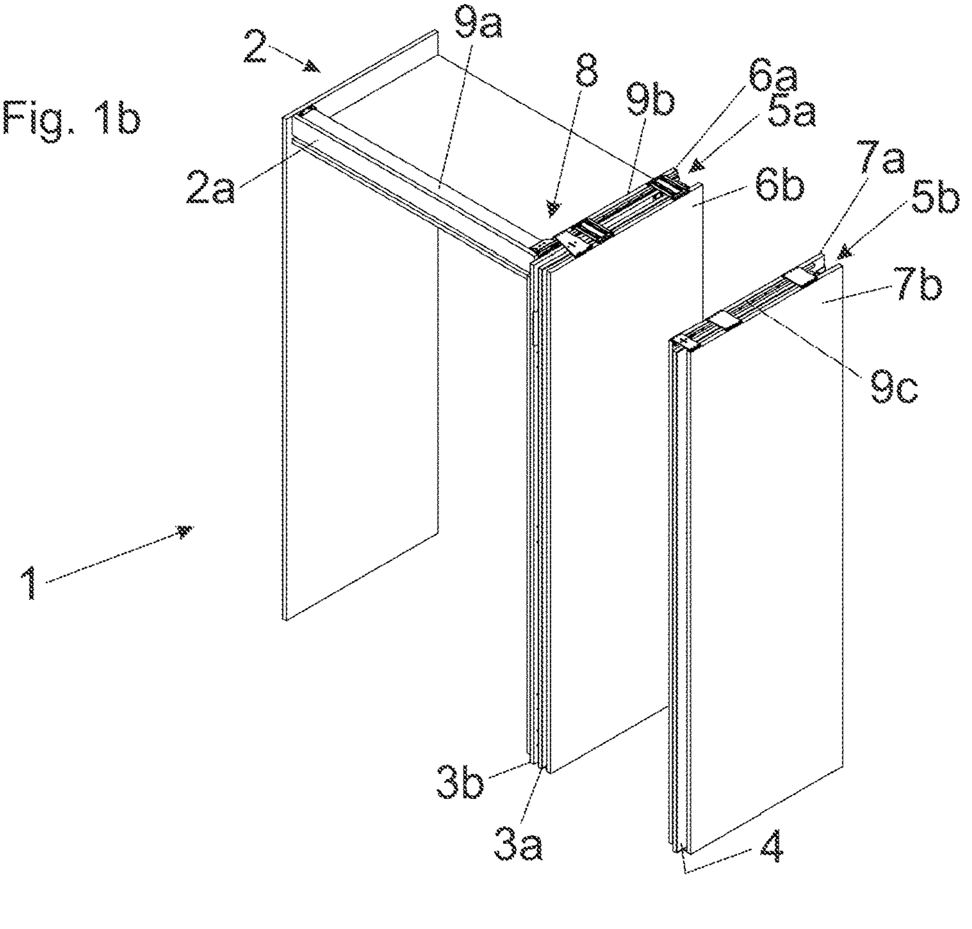

FIG. 1*b* shows the item of furniture 1 according to FIG. 1*a*, in which the door wings 3*a*, 3*b*, in a parallel position to one another, are accommodated within the receiving compartment 5*a*. The door wing 4, on the contrary, is inserted into the receiving compartment 5*b* formed by the two sidewalls 7*a*, 7*b*.

Figure 2A:
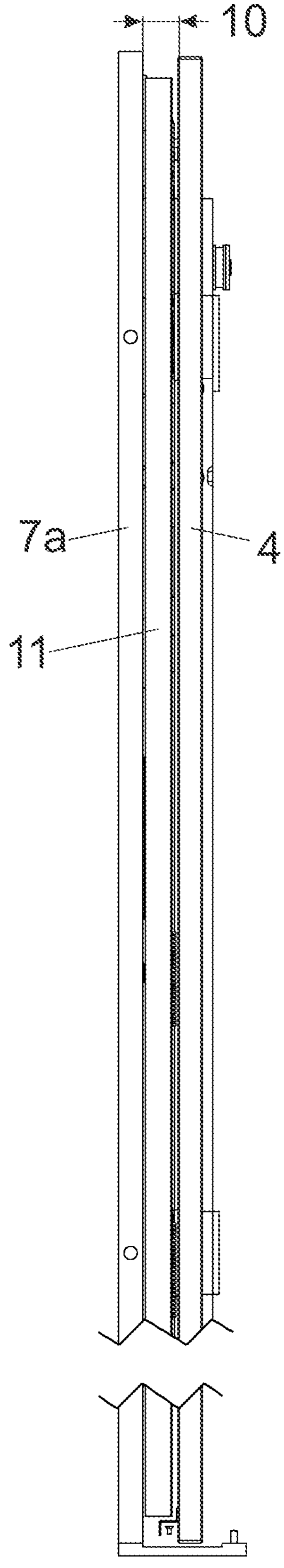
FIG. 2*a*-2*c* show a door wing inserted into the receiving compartment in a view from the front, and two further detail views thereof.

FIG. 2*a* shows the door wing 4 in a view from the front, in which the door wing 4 is aligned parallel to the sidewall 7*a* and is entirely located within the receiving compartment 5*b*. A vertically extending gap 10 is formed between the sidewall 7*a* and the door wing 4, and the gap 10 can be at least partially covered by a movably-supported cover 11. For reasons of simplicity, the functionality of the cover 11 will be described in connection with the door wing 4 and the receiving compartment 5*b*. However, the cover 11 can also be utilized in combination with the two other door wings 3*a*, 3*b*.

Accordingly, a gap 10 is formed between the sidewall 7*a* and the door wing 4. For example, the gap 10 can have a width of approximately 3 cm. The gap 10 can be covered by the cover 11 in a position in which the door wing 4 is inserted into the receiving compartment 5*b*. The cover 4 can have a length corresponding substantially to a height of the door wing 4.

Figure 2B:
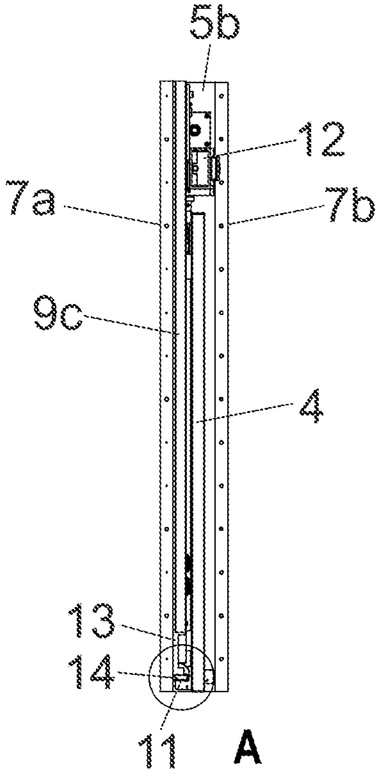

FIG. 2*b* shows the arrangement according to FIG. 2*a* in a top view, in which the door wing 4 is fully countersunk within the receiving compartment 5*b* formed by the sidewalls 7*a*, 7*b*. A guide 9*c* in the form of a rail is fixed to the sidewall 7*a*. The door wing 4 is pivotally mounted about a vertically extending axis on a vertically extending carrier 12, and the carrier 12 is configured to be displaced along the guide 9*c*. A mounting portion 13 is fixed to the front region of the sidewall 7*a*, and the cover 11 is pivotally supported about a vertically extending axis 14 on the mounting portion 13.

Figure 2C:
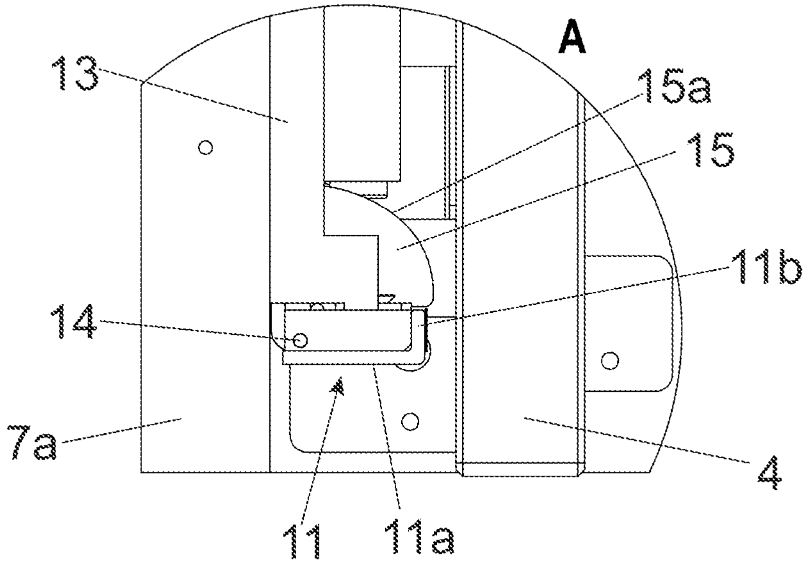

FIG. 2*c* shows the encircled region "A" of FIG. 2*b* in an enlarged view. The mounting portion 13 is fixed to the sidewall 7*a*, and the cover 11 is pivotable relative to the mounting portion 13 about a vertically extending axis 14. The cover 11 includes a first limb 11*a* and a second limb 11*b* transversely protruding from the first limb 11*a*. In a first operating position in which the gap 10 is covered, the first limb 11*a* of the cover 11 is aligned substantially at a right angle to the sidewall 7*a*. A deflection element 15 is supported on the cover 11, the deflection element 15 having a, preferably convex-shaped, deflection contour 15*a*. The deflection element 15, jointly with the cover 11, is configured to be moved about the vertically extending axis 14. By the deflection element 15, a collision between the door wing 4 and the sidewall 7*a* and/or the cover 11 can be prevented, in particular in the case when the door wing 4 is tilted too early relative to the sidewall 7*a* by a person. By the deflection element 15, it is thus ensured that the door wing 4 can only be moved along the front face 2*a* of the furniture carcass 2 after the door wing 4 has entirely been moved out from the receiving compartment 5*b*.

Figure 3A:
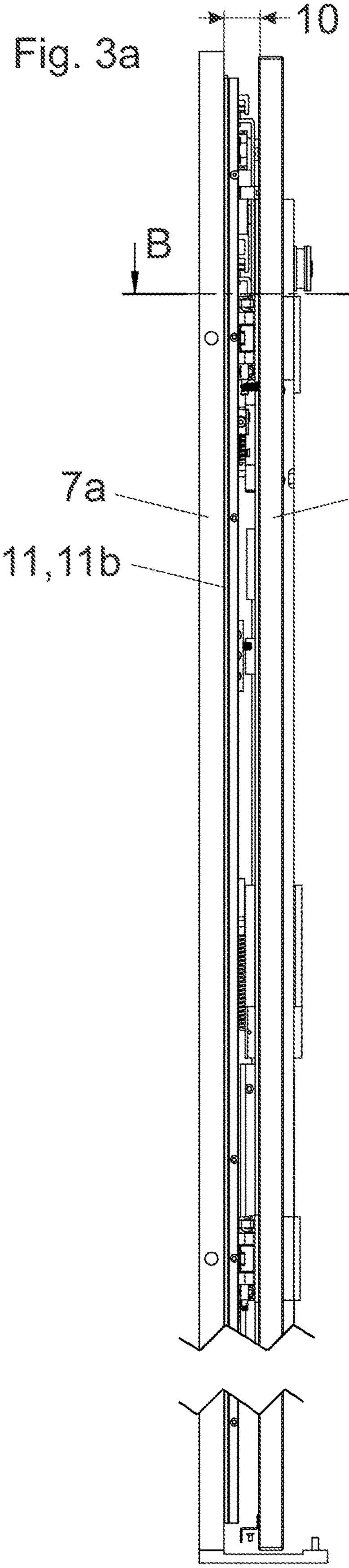
FIG. 3*a*, 3*b* show the receiving compartment for receiving the door wing in a view from the front, and an enlarged cross-sectional view thereof.

FIG. 3*a* shows the receiving compartment 5*b* formed by the sidewalls 7*a*, 7*b* in a view from the front, in which the door wing 4 has been moved out from the receiving compartment 5*b*.

Figure 3B:
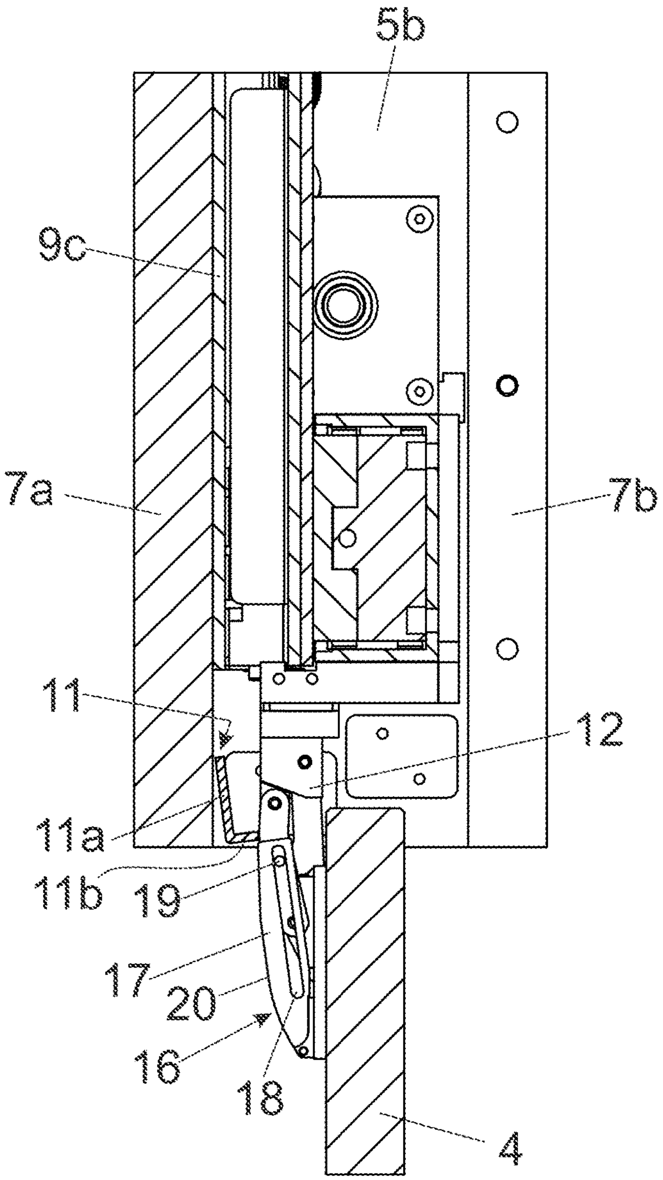

FIG. 3*b* shows a cross-sectional view along the plane B-B depicted in FIG. 3*a*, in which the door wing 4 moved out from the receiving compartment 5*b* can be seen. The door wing 4 is pivotally connected to the carrier 12 via at least one furniture hinge 16, and the carrier 12 is configured to run along the guide 9*c*. The furniture hinge 16 includes at least one control member 17 configured to move the cover 11 between two operating positions upon an at least partial movement of the door wing 4 within the receiving compartment 5*b*. In the first operating position, the cover 11 at least partially covers the receiving compartment 5*b* (FIG. 2*c*). In the second operating position, the cover 11 unblocks the receiving compartment 5*b*, as shown in FIG. 3*b*. In the second operating position, the first limb 11*a* of the cover 11 is aligned approximately parallel to the sidewall 7*a* of the furniture carcass 2. In the first operating position (FIG. 2*c*), the control member 17 of the furniture hinge 16 is spaced from the cover 11 in a depth direction of the receiving compartment 5*b*. At the end of the extension movement of the door wing 4 from the receiving compartment 5*b*, the control member 17 of the furniture hinge 16 can be engaged with the cover 11, in the present case with the second limb 11*b* of the cover 11, whereby the cover 11 is tilted about the vertically extending axis 14 (FIG. 4*b*). The control member 17 of the furniture hinge 16 includes a, preferably elongated, guide track 18, and a guide element 19 of the furniture hinge 16 is configured to be guided along the guide track 18. Moreover, the control member 17 can include a control curve 20 for glidingly supporting the cover 11. By different contours of the control curve 20, different kinematic movement patterns of the cover 11 can be provided.

Figure 4A:
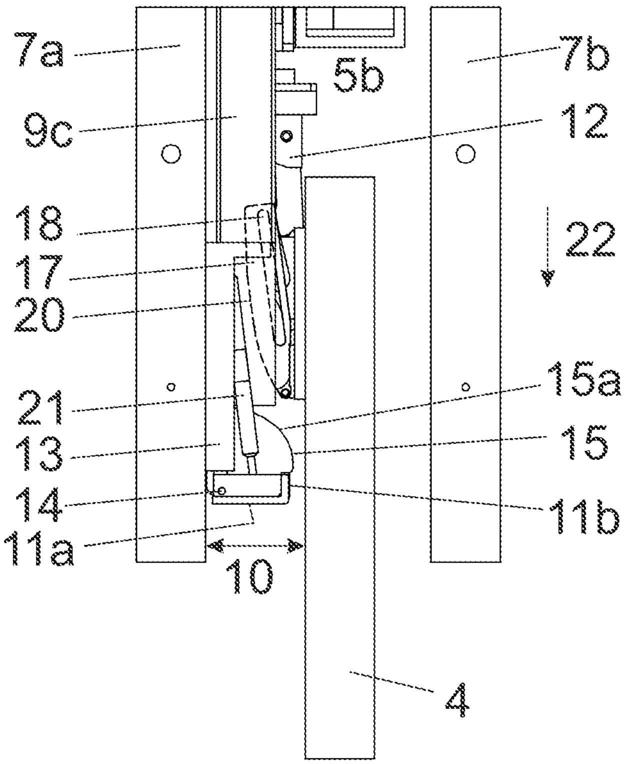
FIG. 4*a*, 4*b* show two different positions of the door wing along the extension direction.
Figure 4B:
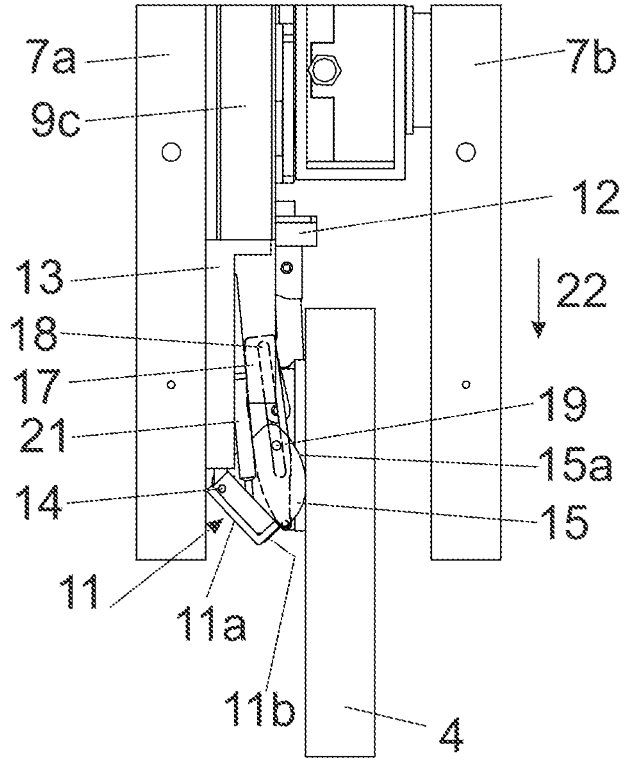

FIG. 4*a* shows a movement of the door wing 4 from the receiving compartment 5*b* in the extension direction 22. The door wing 4 is pivotally supported on the carrier 12 via the furniture hinge 16, and the carrier 12 is displaceable along the guide 9*c* fixed to the sidewall 7*a*. The control member 17 (depicted in dashed lines) with the control curve 20 arranged thereon can be seen, and a movement of the control member 17 is coupled to a movement of the furniture hinge 16. In the shown figure, the control member 17 of the furniture hinge 16 is out of engagement from the cover 11. The cover 11 configured to cover the gap 10 is pivotally supported about the vertically extending axis 14 and is pressurized by a force of a force storage member 21 (for example in the form of a tension spring) in a direction of the first operating position in which the gap 10 can be covered.

Upon a further movement of the door wing 4 in the extension direction 22, the control member 17 contacts the second limb 11*b* of the cover 11, whereby the cover 11 is pivoted about the vertically extending axis 14 (FIG. 4*b*). The door wing 4 can be glidingly supported on the deflection contour 15*a* of the deflection element 15, whereby a collision of the door wing 4 with the cover 11 and/or with the sidewall 7*a* can be prevented. The guide element 19 of the furniture hinge 16 is configured to be displaced along the guide track 18 of the control member 17 upon a movement of the furniture hinge 16, whereby the control member 17 is pivoted about a hinge axis of the furniture hinge 16.

Figure 5A:
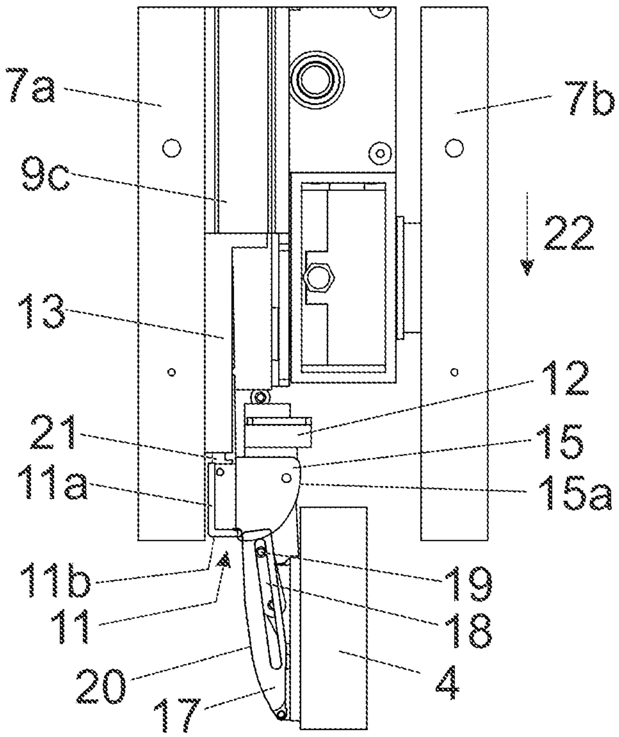
FIG. 5*a*, 5*b* show two further relative positions of the door wing.

FIG. 5*a* shows a continued movement of the door wing 4 in the extension direction 22. The door wing 4 has been moved out from the receiving compartment 5*b* to such an extent that the door wing 4 is out of engagement from the deflection element 15. However, the second limb 11*b* of the cover 11 remains bearing against the control curve 20 of the control member 17, whereby an inadvertent return movement of the cover 11 into the first operating position, caused by a force of the force storage member 21, can be prevented.

Figure 5B:
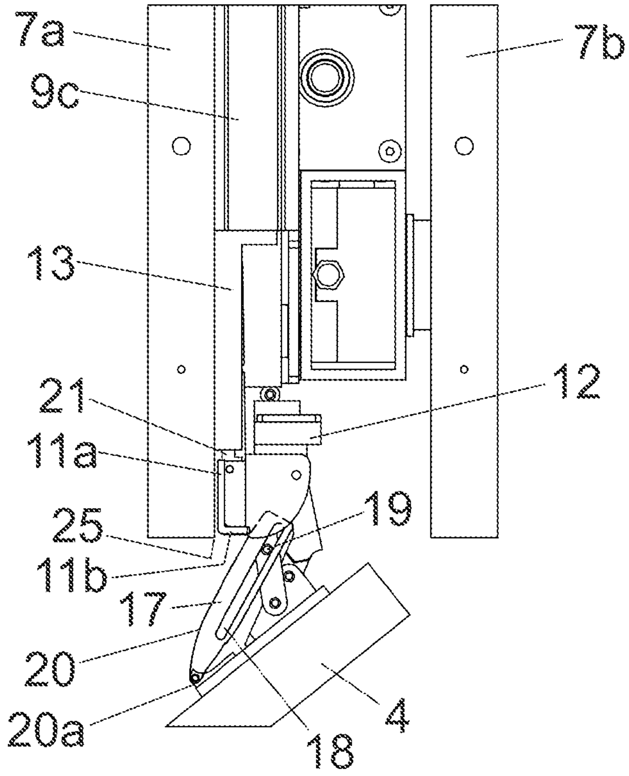

After the door wing 4 has been fully extended from the receiving compartment 5*b*, the door wing 4 can be pivoted about a vertically extending axis relative to the sidewall 7*a*, as shown in FIG. 5*b*. The cover 11, preferably the second limb 11*b* of the cover 11, is configured to be glidingly supported on the control curve 20 of the control member 17. When the door wing 4 has reached the position according to FIG. 1*a*, in which the door wing 4 covers the furniture carcass 2, the second limb 11*b* of the cover 11 bears against an end stop 20*a* of the control curve 20, whereby the cover 11 can be releasably locked in the second operating position.

The sidewall 7*a* has a vertically extending edge 25, about which the door wing 4 can be moved. According to a preferred embodiment, it can be provided that the cover 11 is arranged on that sidewall 7*a* of the furniture carcass 2.

Figure 6A:
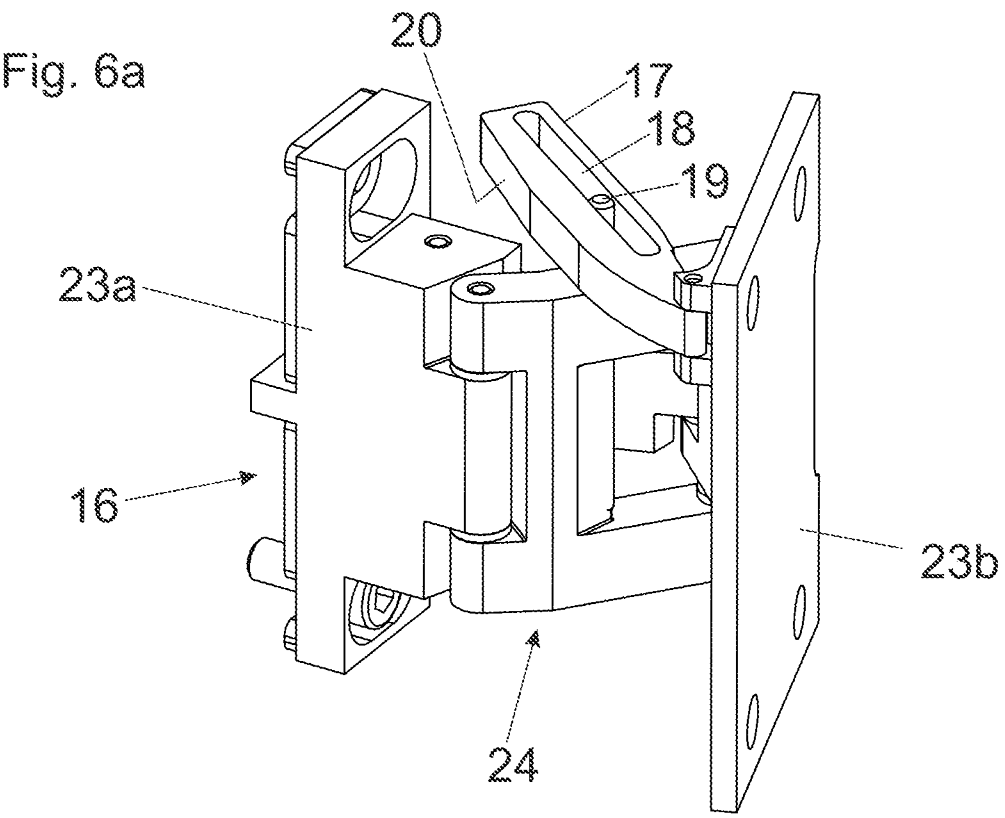
FIG. 6*a*-6*c* are perspective views of a furniture hinge for movably supporting the door wing, and the cover in the first and in the second operating position.

FIG. 6*a* shows an exemplary embodiment of a furniture hinge 16 for movably supporting the door wing 4. The furniture hinge 16 includes a first fitting portion 23*a* configured to be fixed to the carrier 12 and a second fitting portion 23*b* configured to be fixed to the door wing 4. The fitting portions 23*a*, 23*b* are connected to one another by a joint mechanism 24. The furniture hinge 16 includes the control member 17 with the control curve 20 arranged thereon, the control curve 20 being configured to co-operate with the cover 11, preferably with the second limb 11*b* of the cover 11. The guide element 19 is displaceably guided on or in a guide track 18 of the control member 17. Instead of a guide element 19 engaging into the guide track 18, the control member 17 can also be coupled to a movement of the furniture hinge 16 by co-operating tooth arrangements.

Figure 6B:
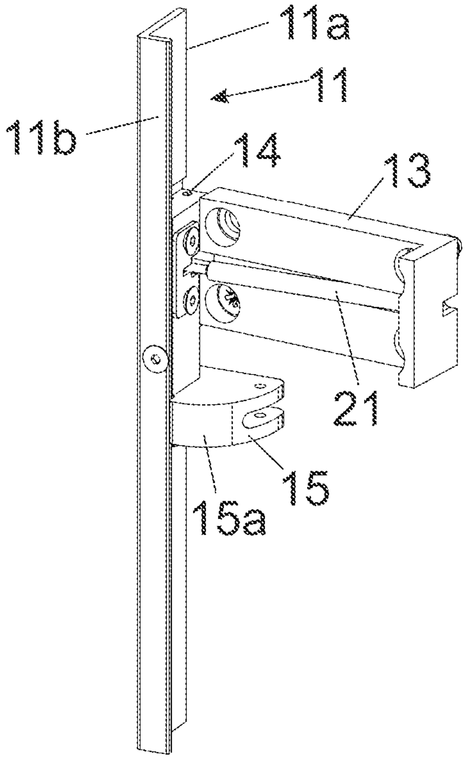

FIG. 6*b* shows the cover 11 in the first operating position in which the gap 10 formed between the sidewall 7*a* and the door wing 4 can be covered. The cover 11 is pivotally connected to the mounting portion 13 via the vertically extending axis 14, the mounting portion 13 being configured to be fixed to the sidewall 7*a*. By a force of the force storage member 21, preferably in the form of a tension spring, the cover 11 can be permanently pre-stressed in a direction of the first operating position. Moreover, the deflection element 15 with the deflection contour 15*a* is arranged on the cover 11, and a collision of the door wing 4 with the sidewall 7*a* and/or with the cover 11 can be prevented by the deflection contour 15*a*. The two limbs 11*a*, 11*b* of the cover 11 can have a different length, and the first limb 11*a* can have a length which is at least three times as long as a length of the second limb 11*b*. In the first operating position of the cover 11, the first limb 11*a* is aligned substantially perpendicular to the sidewall 7*a*.

Figure 6C:
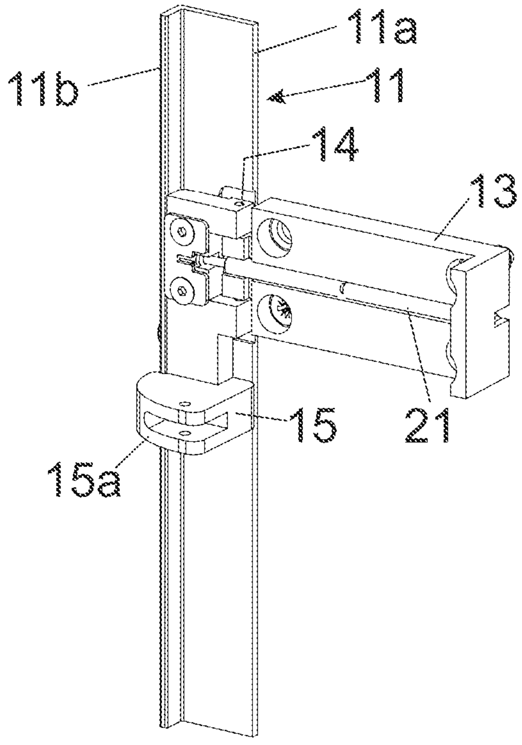

FIG. 6*c* shows the cover 11 in the second operating position in which the cover 11 unblocks the receiving compartment 5*b*. In the second operating position, the first limb 11*a* of the cover 11 is aligned substantially parallel to the sidewall 7*a* so as to unblock a movement of the furniture hinge 16 from the receiving compartment 6*b*. The cover 11 is thus configured to be switched between the first operating position and the second operating position by a pivoting movement about the axis 14 within an angle range of between 70° and 110°, preferably by substantially 90°.

The fitting portions 23*a*, 23*b* of the furniture hinge 16 and the mounting portion 13 of the cover 11 can each have at least one fastening location (for example in the form of bores, dowels or locking elements) for fixing these components to the intended positions.

The invention claimed is:

1. An item of furniture, comprising:
- a furniture carcass;
- a door wing movably-supported relative to the furniture carcass;
- a furniture hinge for movably supporting the door wing, the furniture hinge being hingedly connected to the door wing;
- a receiving compartment arranged in or on the furniture carcass for at least partially receiving the door wing, the receiving compartment being defined by a sidewall of the furniture carcass; and
- a cover configured to be moved at least between a first operating position, in which the cover at least partially covers the receiving compartment, and a second operating position, in which the cover unblocks the receiving compartment,
- wherein the furniture hinge includes a control member for moving the cover between the first and second operating positions upon an at least partial movement of the door wing within the receiving compartment,
- wherein the sidewall has a vertically extending edge about which the door wing can be moved, and wherein the cover is arranged on the sidewall of the furniture carcass.

2. The item of furniture according to claim 1, wherein a movement of the control member is coupled to a movement of the furniture hinge.

3. The item of furniture according to claim 1, wherein the cover is pivotally supported about a vertically extending axis.

4. The item of furniture according to claim 1, wherein the cover has a first limb and a second limb protruding transversely from the first limb.

5. The item of furniture according to claim 4, wherein the second limb protrudes from the first limb at a right angle, and wherein the control member of the furniture hinge is configured to be engaged with the second limb of the cover upon a movement of the door wing within the receiving compartment.

6. The item of furniture according to claim 4, wherein the first limb and the second limb of the cover each have a different length.

7. The item of furniture according to claim 6, wherein the first limb has a length which is at least three times as long as the second limb.

8. The item of furniture according to claim 1, further comprising a guide for guiding the door wing, the guide being configured so as to guide the door wing along the sidewall of the furniture carcass.

9. The item of furniture according to claim 1, wherein a deflection element is provided for supporting the door wing, and the deflection element is configured to prevent a collision between the door wing and the furniture carcass or the cover.

10. The item of furniture according to claim 9, wherein the deflection element is arranged on the cover, and the deflection element is configured to prevent a collision between the door wing and the sidewall of the furniture carcass or the cover.

11. The item of furniture according to claim 9, wherein the deflection element includes a deflection contour for glidingly supporting the door wing.

12. The item of furniture according to claim 11, wherein the deflection contour is a convex-shaped deflection contour.

13. An item of furniture, comprising:

a furniture carcass;

a door wing movably-supported relative to the furniture carcass;

a furniture hinge for movably supporting the door wing, the furniture hinge being hingedly connected to the door wing;

a receiving compartment arranged in or on the furniture carcass for at least partially receiving the door wing, the receiving compartment being defined by a sidewall of the furniture carcass; and a cover configured to be moved at least between a first operating position, in which the cover at least partially covers the receiving compartment, and a second operating position, in which the cover unblocks the receiving compartment, wherein the furniture hinge includes a control member for moving the cover between the first and second operating positions upon an at least partial movement of the door wing within the receiving compartment, and wherein the control member of the furniture hinge is spaced from the cover in a depth direction of the receiving compartment in the first operating position of the cover, and bears against the cover in the second operating position.

14. An item of furniture, comprising:

a furniture carcass;

a door wing movably-supported relative to the furniture carcass;

a furniture hinge for movably supporting the door wing, the furniture hinge being hingedly connected to the door wing;

a receiving compartment arranged in or on the furniture carcass for at least partially receiving the door wing, the receiving compartment being defined by a sidewall of the furniture carcass; and a cover configured to be moved at least between a first operating position, in which the cover at least partially covers the receiving compartment, and a second operating position, in which the cover unblocks the receiving compartment, wherein the furniture hinge includes a control member for moving the cover between the first and second operating positions upon an at least partial movement of the door wing within the receiving compartment, and wherein the control member of the furniture hinge includes at least one control curve for glidingly supporting the cover.

15. An item of furniture, comprising:

a furniture carcass;

a door wing movably-supported relative to the furniture carcass;

a furniture hinge for movably supporting the door wing, the furniture hinge being hingedly connected to the door wing;

a receiving compartment arranged in or on the furniture carcass for at least partially receiving the door wing, the receiving compartment being defined by a sidewall of the furniture carcass; and a cover configured to be moved at least between a first operating position, in which the cover at least partially covers the receiving compartment, and a second operating position, in which the cover unblocks the receiving compartment, wherein the furniture hinge includes a control member for moving the cover between the first and second operating positions upon an at least partial movement of the door wing within the receiving compartment, and wherein the control member of the furniture hinge includes a guide track, and a guide element of the furniture hinge is displaceably guided along the guide track.

16. The item of furniture according to claim 15, wherein the guide track is an elongated guide track.

17. An item of furniture, comprising:

a furniture carcass;

a door wing movably-supported relative to the furniture carcass;

a furniture hinge for movably supporting the door wing, the furniture hinge being hingedly connected to the door wing;

a receiving compartment arranged in or on the furniture carcass for at least partially receiving the door wing, the receiving compartment being defined by a sidewall of the furniture carcass; and a cover configured to be moved at least between a first operating position, in which the cover at least partially covers the receiving compartment, and a second operating position, in which the cover unblocks the receiving compartment, wherein the furniture hinge includes a control member for moving the cover between the first and second operating positions upon an at least partial movement of the door wing within the receiving compartment, and wherein the cover is pivotally supported on a mounting portion configured to be fixed to the furniture carcass.

18. The item of furniture according to claim 17, wherein mounting portion is configured to be fixed to the sidewall of the furniture carcass.

19. An item of furniture, comprising:

a furniture carcass;

a door wing movably-supported relative to the furniture carcass;

a furniture hinge for movably supporting the door wing, the furniture hinge being hingedly connected to the door wing;

a receiving compartment arranged in or on the furniture carcass for at least partially receiving the door wing, the receiving compartment being defined by a sidewall of the furniture carcass; and a cover configured to be moved at least between a first operating position, in which the cover at least partially covers the receiving compartment, and a second operating position, in which the cover unblocks the receiving compartment, wherein the furniture hinge includes a control member for moving the cover between the first and second operating positions upon an at least partial movement of the door wing within the receiving compartment, and wherein the cover is coupled to a force storage member, the force storage member being configured to exert a force on the cover so as to pressurize the cover in a direction of the first operating position.

20. An item of furniture, comprising:

a furniture carcass;

a door wing movably-supported relative to the furniture carcass;

a furniture hinge for movably supporting the door wing, the furniture hinge being hingedly connected to the door wing;

a receiving compartment arranged in or on the furniture carcass for at least partially receiving the door wing, the receiving compartment being defined by a sidewall of the furniture carcass; and a cover configured to be moved at least between a first operating position, in which the cover at least partially covers the receiving compartment, and a second operating position, in which the cover unblocks the receiving compartment, wherein the furniture hinge includes a control member for moving the cover between the first and second operating positions upon an at least partial movement of the door wing within the receiving compartment, and wherein the cover has a length corresponding substantially to a height of the door wing.

* * * * *